(12) United States Patent
Romero Galan et al.

(10) Patent No.: US 11,346,138 B2
(45) Date of Patent: May 31, 2022

(54) SYSTEM FOR MONITORING THE STATE OF A HOOK-KEEPER UNIT

(71) Applicant: Airbus Defence and Space, S.A.U., Getafe (ES)

(72) Inventors: Francisco Romero Galan, Getafe (ES); Carlos Manuel Escribano Serrano, Getafe (ES); Isabel Romero Molina, Getafe (ES); Jesús De Gracia Maqueda, Getafe (ES)

(73) Assignee: AIRBUS DEFENCE AND SPACE S.A.U., Getafe (ES)

( * ) Notice: Subject to any disclaimer, the term of this patent is extended or adjusted under 35 U.S.C. 154(b) by 865 days.

(21) Appl. No.: 16/178,759

(22) Filed: Nov. 2, 2018

(65) Prior Publication Data

US 2019/0136589 A1    May 9, 2019

(30) Foreign Application Priority Data

Nov. 3, 2017   (EP) .................................... 17382736

(51) Int. Cl.
*E05B 81/72*    (2014.01)
*B64D 29/06*   (2006.01)
(Continued)

(52) U.S. Cl.
CPC .............. *E05B 81/72* (2013.01); *B64D 29/06* (2013.01); *E05B 41/00* (2013.01); *E05B 53/005* (2013.01);
(Continued)

(58) Field of Classification Search
CPC .......... E05B 81/64; E05B 81/66; E05B 81/72; E05B 41/00; E05B 53/005; E05B 63/143;
(Continued)

(56) References Cited

U.S. PATENT DOCUMENTS 3,576,119 A * 4/1971 Harris ................. E05B 47/0002
70/271
4,557,441 A   12/1985 Aspinall
(Continued)

FOREIGN PATENT DOCUMENTS

EP          2829474 A1   1/2015

OTHER PUBLICATIONS

European Search Report; priority document.

*Primary Examiner* — Christine M Mills
*Assistant Examiner* — Yahya Sidky
(74) *Attorney, Agent, or Firm* — Greer, Burns & Crain, Ltd.

(57) ABSTRACT

A system for monitoring the state of a hook-keeper unit of an aeronautical structure. The hook-keeper unit is movable between a latched state and in a non-latched state, a mechanical warning element is movable between an exposed state and an unexposed state, and a connecting mechanism comprises a first end coupled to the hook-keeper unit, and a second end coupled to the mechanical warning element. The connecting mechanism is configured to automatically transmit the state of the hook-keeper unit to the mechanical warning element. The hook-keeper unit and the mechanical warning element are coupled between them by the connecting mechanism in an automatic bijective relationship, so that when the hook-keeper unit is in the latched state, the mechanical warning element is automatically in the unexposed state, and when the hook-keeper unit is in the non-latched state, the mechanical warning element is automatically in the exposed state.

12 Claims, 9 Drawing Sheets

(51) Int. Cl.
*E05B 41/00* (2006.01)
*E05B 53/00* (2006.01)
*E05B 63/14* (2006.01)
*E05C 1/08* (2006.01)
*E05C 19/12* (2006.01)

(52) U.S. Cl.
CPC ............... *E05B 63/143* (2013.01); *E05C 1/08* (2013.01); *E05C 19/12* (2013.01)

(58) Field of Classification Search
CPC ..... E05B 2047/0067; E05B 2047/0069; B64D 29/06; E05C 1/08; E05C 19/12; E05C 3/30; E05C 3/045
See application file for complete search history.

(56) References Cited

U.S. PATENT DOCUMENTS

| | | | |
|---|---|---|---|
| 4,828,299 A | 5/1989 | Poe | |
| 6,382,690 B1 | 5/2002 | Dessenberger, Jr. | |
| 8,764,072 B2 * | 7/2014 | Gonidec | E05C 19/12 292/129 |
| 10,267,060 B2 * | 4/2019 | Frommer | B64D 29/06 |
| 2014/0030079 A1 * | 1/2014 | Provost | B64D 29/06 415/201 |
| 2014/0225380 A1 | 8/2014 | Gonidec | |
| 2015/0021928 A1 * | 1/2015 | Garc a de la Torre | |

* cited by examiner

SYSTEM FOR MONITORING THE STATE OF A HOOK-KEEPER UNIT

CROSS-REFERENCES TO RELATED APPLICATIONS

This application claims the benefit of the European patent application No. 17382736.1 filed on Nov. 3, 2017, the entire disclosures of which are incorporated herein by way of reference.

BACKGROUND OF THE INVENTION

The present invention belongs to the field of safety operation in aeronautics, in particular to the field of monitoring the proper and securely locking of an aircraft fairing. More specifically, the invention is of special application in the closure and securely locking of an engine's two-part cowl.

Aircraft should undergo periodic inspections, the so-called aircraft maintenance checks, after a certain amount of time or usage, which varies by aircraft type, the cycle count (the sum of a "takeoff" and "landing" are considered as an aircraft cycle), or even the number of hours flown since the last check.

These routine inspections lead to mitigate the failures of any of the aircraft systems during operation, both in-flight and on-ground. Nevertheless, the maintenance operations may require the further verification that the system checked recovers its original state for being operated safely.

One of these systems is the engine's nacelles, which are equipped with a two-part cowl articulated by an upper longitudinal hinge to allow its aperture. In ordinary maintenance operation, the two-part cowl are opened to access to the equipment and subsystems installed inside of the engine, while the aircraft is on-ground.

As it was mentioned, once the maintenance task is done, the two-part cowl are closed, wherein the closure is assure by a set of hook-keeper units arranged alongside its bottom end.

The pairs of hook and keeper are latched, maintaining the two-part cowl closed during operation of the aircraft. However, if a non-proper closure (the pair hook and keeper not totally engaged) happens due to an unintentional or inadvertent mistake from operators; it is likely during the aircraft takeoff or early flight that an accidental aperture of the two-part cowl takes place and, as a consequence, this cowling might be detached because of the aircraft speed.

Therefore, to solve this problem, a variety of systems have been provided being all summarized in highlighting the non-proper closure of the two-part cowl by an alert signal on-ground. In this situation, during the pre-flight "walk around," if the operators recognize an open state of the two-part cowl, they must close it and afterwards go to the alert signal spot to manually disable it or shut it down, accordingly.

In addition, if the engine is mounted beneath the aircraft wing, the two-part cowl or cowling locking mechanism is located beneath the engine in a position which is very close to the ground being therefore awkward to access. This adds additional problems to the verification carried out by the operators.

This proceeding leads to a delay in the "walk around" established-time, and also a risk in the overall procedure due to the ultimate responsibility resting in the operator in charge, therefore giving rise to human factors (especially during in line maintenance tasks).

SUMMARY OF THE INVENTION

In a first inventive aspect, the invention provides a system for monitoring the state of a hook-keeper unit of an aeronautical structure, wherein the hook-keeper unit comprises a hook and a keeper, the system comprising:
  the hook-keeper unit configured to be in a latched state and in a non-latched state,
  a mechanical warning element configured to be in an exposed state and in an unexposed state, and
  a connecting mechanism comprising a first end coupled to the hook-keeper unit, and a second end coupled to the mechanical warning element, the connecting mechanism being configured to automatically transmit the state of the hook-keeper unit to the mechanical warning element,
  wherein the hook-keeper unit and the mechanical warning element are coupled between them by the connecting mechanism in an automatic bijective relationship, so that:
  when the hook-keeper unit is in the latched state, the mechanical warning element automatically is in the unexposed state, and
  when the hook-keeper unit is in the non-latched state, the mechanical warning element automatically is in the exposed state.

Throughout this entire document, the two-part cowl and the cowling will be understood as equivalent terms, being referred to the covering of an aircraft engine.

In addition, the expression that the hook-keeper unit is configured to be in a latched state and in a non-latched state means that the pair hook and keeper are configured to be either engaged or non-engaged depending on the closure or aperture of the two-part cowl, accordingly.

Advantageously, this system allows saving time in the non-scheduled maintenance tasks from the operators, i.e., those line maintenance tasks performed on-ground prior to flight which require a quick and effective actuation from the operators in order not to delay the takeoff excessively. By the system provided in the first inventive aspect and onwards, it is not required that the operators go to the alert signal spot to manually disable it or shut it down, after the closure of the two-part cowl to restore the position of the alert signal.

In addition, this system improves the detectability of the state of the hook-keeper unit as the ultimate responsibility of the operator is avoided. In other words, the system automatically updates the state of the mechanical warning element according to the state of the hook-keeper unit without the need of any help or additional task by the operator (as the prior art does).

All the previous systems addressed in the background of the invention needed a final action by the operator to manually shut-down the alert signal somehow, which would not close until all the hook-keepers units were properly closed (equivalent to the hook-keeper unit being in the latched state in the first inventive aspect). This latter system was inefficient in a time-demanding field as aircraft operations and maintenance.

Moreover, the mechanical warning element comprised in the system described in the first inventive aspect is suitable for being placed in any part of the aircraft, in particular where it can be easily visible, when positioned in the exposed state, by the person in charge of monitoring the correct locking of the hook-keeper unit(s), i.e., an operator.

Throughout this entire document, the bijective relationship will be understood as one-to-one correspondence or unequivocal relationship between the states of the hook-keeper unit and the mechanical warning element.

In this sense, the non-latched state of the hook-keeper unit is automatically transmitted (without manual tasks from operators) to the mechanical warning element by the connecting mechanism, being therefore in the exposed state. In the event the hook-keeper unit is closed, being in the latched state, it produces an automatic transmission (without manual tasks from operators) to the mechanical warning element throughout the connecting mechanism, being therefore in the unexposed state. Hence, the state switching of the hook-keeper unit is automatically spread by the connecting mechanism to update the state mechanical warning element.

In a particular embodiment, the connecting mechanism comprises at the first end a tilting piece, the tilting piece comprising two portions fixedly joined by a tilting axis, wherein a first portion is rotatably joined to the hook-keeper unit and the second portion is connected to a substantially inextensible coupling element of the connecting mechanism.

In other words, the tilting piece may comprise an integral piece corresponding to the two portions, and an intermediate pivoting point corresponding to the tilting axis, i.e., the tilting piece is a rigid piece with two portions. Hence, the angle between the two portions is maintained when pivoting, and the force exerted in one end of any of the two portions is directly transmitted to the other end of the other portion.

Thus, the inextensible coupling element is pulled or pushed according to the state of the hook-keeper unit.

In a particular embodiment, the connecting mechanism comprises at the second end a positioner device fixedly joined to the mechanical warning element, the positioner device being configured to rotate around a rotating axis so that the mechanical warning element automatically is in the exposed or in the unexposed state according to the state of a hook-keeper unit.

Therefore, the positioner device changes the axial displacement of the second end of the connecting mechanism into an angular displacement for rotating the mechanical warning element.

In a particular embodiment, the positioner device comprises a torsion spring configured to be in:
a twisted state corresponding to the unexposed state of the mechanical warning element, and
a default state corresponding to the exposed state of the mechanical warning element.

In a particular embodiment, either the hook or the keeper of the hook-keeper unit is configured to be displaced from each other, wherein:
if the hook or the keeper are displaced from each other, the hook-keeper unit is in the non-latched state; and
if the hook or the keeper are not displaced from each other, the hook-keeper unit is in the latched state.

Such displacement of either the hook or the keeper of the hook-keeper unit may be axial, radial or rotational. Nevertheless, all of them imply the switching of the state of the hook-keeper unit between the non-latched state and latched state, or vice-versa.

In a particular embodiment, the substantially inextensible coupling element transmits the displacement of either the hook or the keeper from the second portion of the tilting piece to the positioner device, the substantially inextensible coupling element being preferably a cable. More preferably, the cable is a push-pull cable.

In a particular embodiment, the mechanical warning element is configured to be positioned:
inside the aeronautical structure in the unexposed state, and
outside the aeronautical structure in the exposed state.

In a particular embodiment, the mechanical warning element is a flag, and wherein the exposure of the flag comprises a rotatable deployment.

Advantageously, these two embodiments allows an improved visualization of the mechanical warning element for the operators in the exposed state.

In a particular embodiment, the hook of the hook-keeper unit is configured to be latched with the keeper, and the hook-keeper unit further comprises:
a rod rigidly connected to either the hook or the keeper; and
a spring coupled with the rod, the spring configured to be in:
an rest state corresponding to the non-latched state of the hook-keeper unit, and
a compressed state corresponding to the latched state of the hook-keeper unit.

In a particular embodiment, the rod is rigidly connected to the keeper. By this embodiment, it should be understood that the displacement implying the switching of the state of the hook-keeper unit relies on the displacement of the keeper, while the hook keeps still.

In a particular embodiment, the hook-keeper unit comprises a pair proximity sensor-target configured to match when the hook-keeper unit is in the latched state.

Advantageously, this allows a redundant safety system for advert the state of the hook-keeper unit. The proximity sensor and target are able to cope with the other, transmitting the signal according to the position of its counterpart.

In a particular embodiment, the target is placed on the rod being both configured to be displaced together according to the displacement of either the hook or the keeper.

In a particular embodiment, the proximity sensor is configured to send a signal with the state of the hook-keeper unit to a remote system by a connection, preferably by an electrical connection.

Preferably, the signal is sent to a notice panel in the cockpit of the aircraft to be visible by the pilots. Advantageously, this embodiment provides that the pilot(s) know(s) the whole time the state of the hook-keeper unit.

More preferably, the connection may be electrical by a harness, contactless . . . or the like.

In a particular embodiment, the system comprises a plurality of hook-keeper units, and the connecting mechanism comprises a plurality of first ends.

In a second inventive aspect, the invention provides a two-part-cowl of an aircraft comprising the system according to any of previous embodiments of the first inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 3b shows a perspective view of the FIG. 3a.

DETAILED DESCRIPTION OF THE PREFERRED EMBODIMENTS

Two-Part Cowl (100) of an Aircraft Engine

Figure 1A:
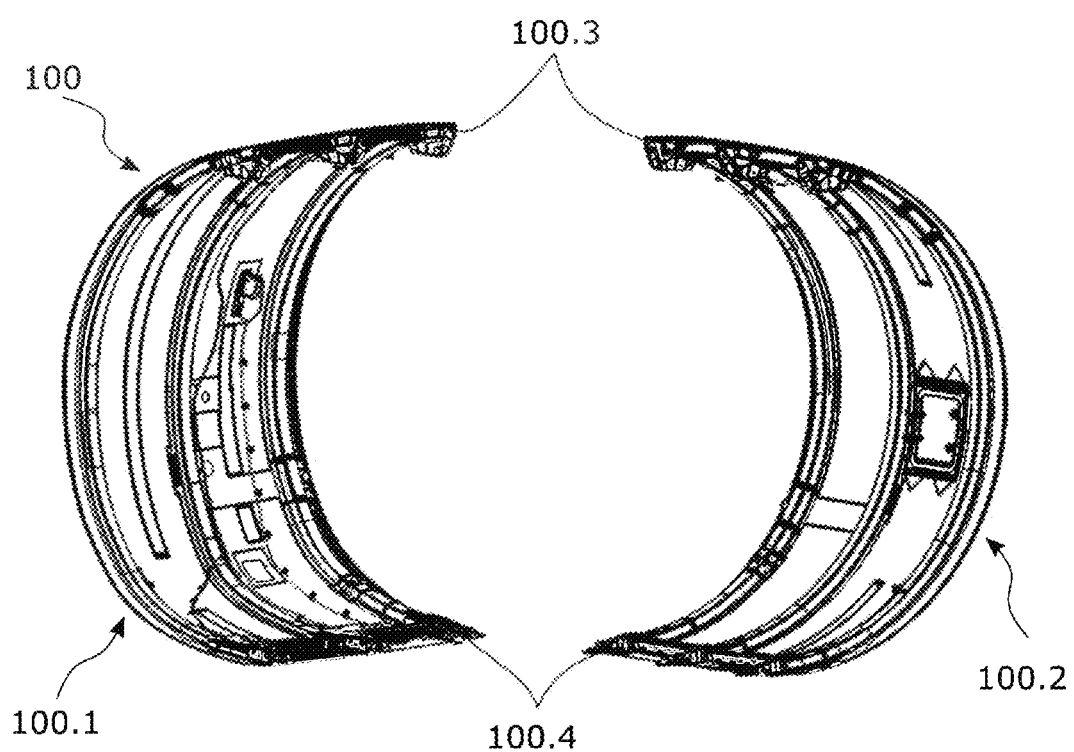
FIG. 1a shows a two-part cowl of an aircraft engine.
Figure 1B:
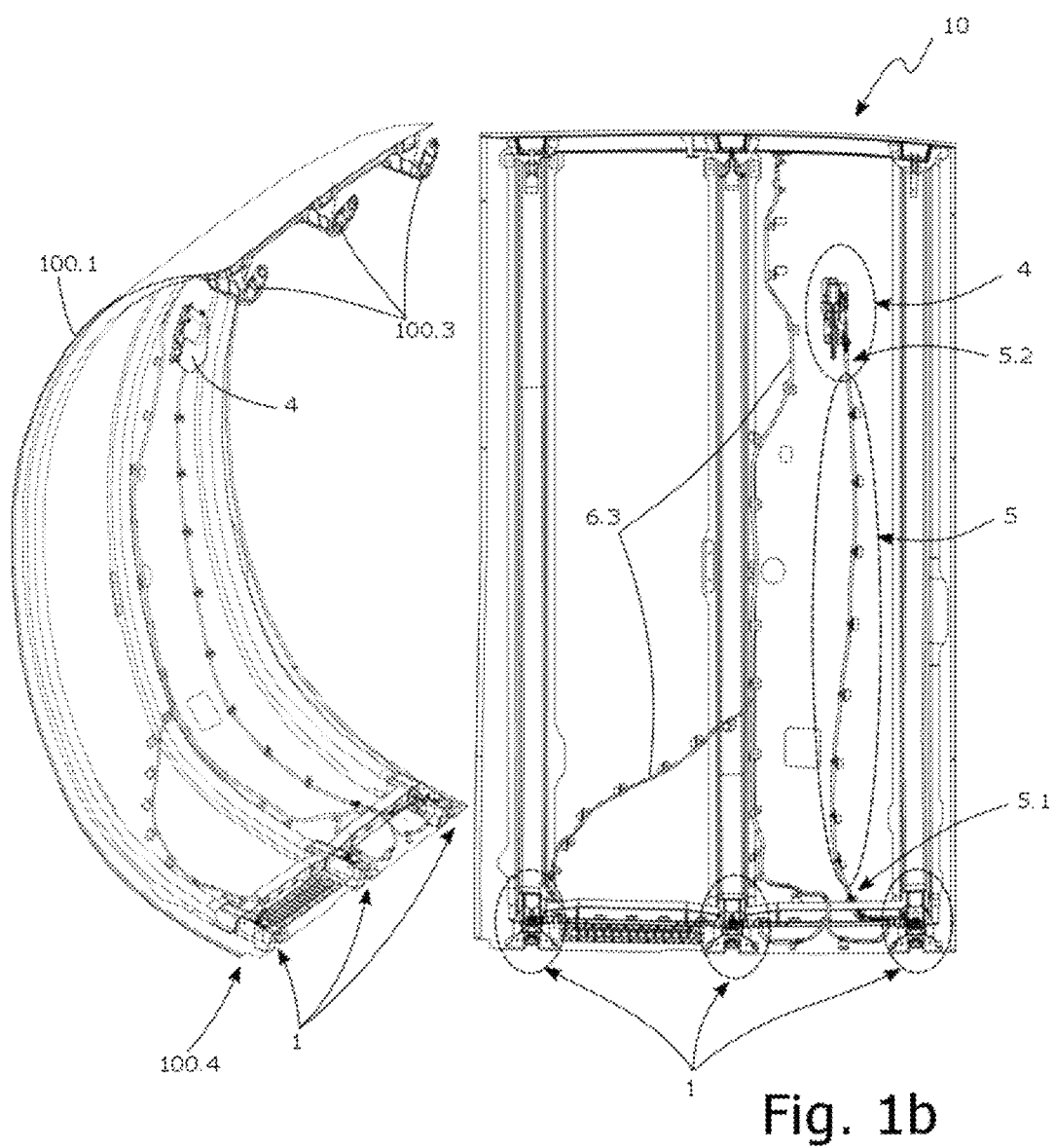
FIG. 1b shows a transverse and interior view of one cowling part.

FIGS. 1a and 1b show a two-part cowl (100) or cowling of an aircraft. In particular, FIG. 1a shows an exploded view of the two parts (100.1, 100.2) of the cowling facing each other. The two parts (100.1, 100.2) are articulated by an upper longitudinal hinge (100.3) to allow its aperture, while alongside of its bottom end (100.4) a set of hook-keeper units (1) are spatially arranged.

FIG. 1b shows in its left figure a transverse or side view of one part (100.1) of the cowling (100), and shows in the right figure an interior view of the part (100.1). As it can be seen, the two-part-cowl (100) comprises a system (10) comprising:

a set of hook-keeper units (1), each one comprising a pair of a hook (2) and a keeper (3) (shown in detail in FIGS. 2a-2b), a mechanical warning element (4) able to be positioned inside the cowling part (100.1) in an unexposed state (C), and outside in the exposed state (D) (shown in FIG. 3c), and a connecting mechanism (5) between the hook-keeper units (1) and the mechanical warning element (4) to automatically transmit the state of the hook-keeper unit (1) to the mechanical warning element (4).

The connecting mechanism (5) comprises a first end (5.1) coupled to the hook-keeper unit (1), and a second end (5.2) coupled to the mechanical warning element (4).

Additionally, it can be seen that the system comprises a connection (6.3) in the form of an electrical harness to send a signal identifying the latched/non-latched state of the hook-keeper unit (1) to a remote system (not shown).

Hook-Keeper Unit (1)

Figure 2A:
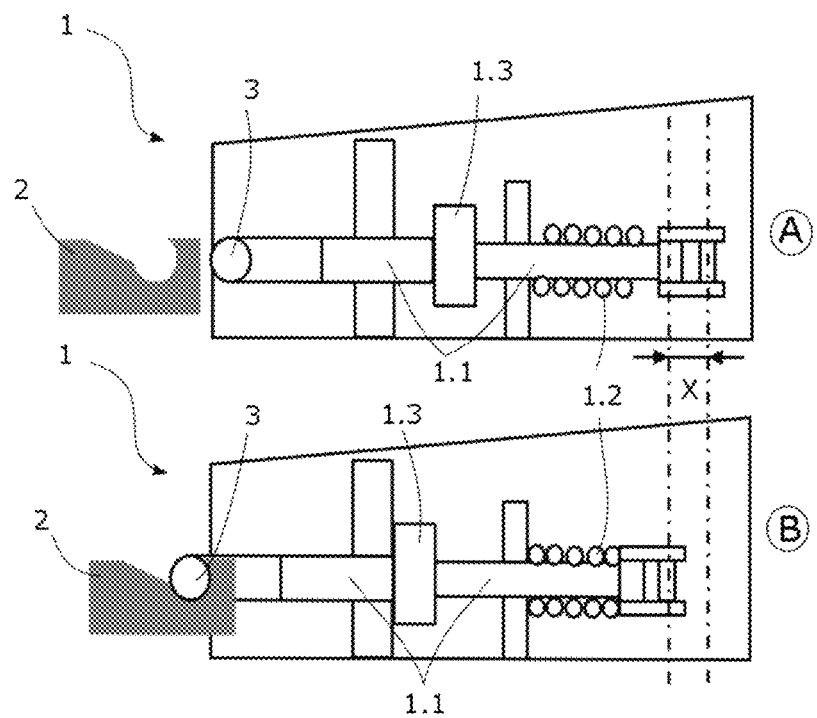
FIG. 2a shows a schematic view of a hook-keeper unit in its two states.

FIG. 2a shows a particular hook-keeper unit (1) of the system (10) according to the invention. The hook-keeper unit (1) comprises:

a keeper (3);

a hook (2) configured to be latched or engaged with the keeper (3);

a rod (1.1) rigidly connected to the keeper (3), and a spring (1.2) coupled with the rod (1.1) and configured to be compressed.

It is to be noted that if the hook (2) is installed on one part (100.1) of the two-part cowl (100), the keeper (3) is to be installed on the other part (100.2), or vice-versa.

In the embodiments shown in this description, the hook-keeper unit (1) is configured to be in a latched state (B) and in a non-latched state (A), wherein:

the latched state (B) is identified with an outward state, because the keeper (3) is out further from the cowling part (100.1) to reach to and be engaged with the hook (2) installed on the other cowling part (100.2), and the non-latched state (A) is an inward state, because the keeper (3) is nearer the cowling part (100.1).

In this particular embodiment, each rod (1.1) further comprises an adjustment device (1.3) to absorb the diameter size difference between the biggest in the front part intended to connect to the keeper (3), and the smallest in the rear part intended to be surrounded by the spring (1.2).

As mentioned, the hook-keeper unit (1) is configured to switch between a latched (B) and a non-latched (A) state. This switching of the states (A, B) is identified by the displacement (X) of the keeper (3) along the longitudinal axis of the rod (1.1) and, thus, the pair of hook (2) and keeper (3) are:

not displaced from each other in the latched state (B), also corresponding to a compressed state of the spring (1.2), and displaced a distance (X) from each other, preferably the distance (X) being 12.7 mm, in the non-latched state (A), also corresponding to a rest state of the spring (1.2) which pulls the rod (1.1) inwards if no force is exerted.

Figure 2B:
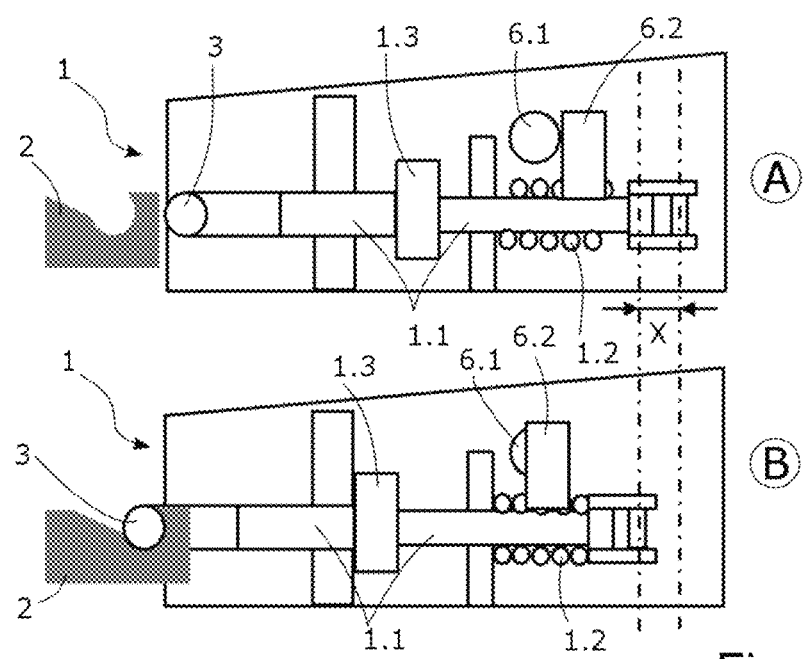
FIG. 2b shows a schematic view of a hook-keeper unit in its two states comprising a pair proximity sensor-target.

FIG. 2b shows a particular embodiment of the hook-keeper unit (1) further comprising a pair proximity sensor (6.1)-target (6.2) configured to match when the hook-keeper unit (1) is in the latched state (B). This pair proximity sensor (6.1)-target (6.2) forms an electrical warning element which is adapted to be activated by the rod (1.1) when it moves to an outward position. The hook-keeper unit (1) comprises a structure which contains the proximity sensor (6.1) configured to detect its counterpart, i.e. the target (6.2), arranged on the rod (11). Hence, the target (6.2) placed or arranged on the rod (1.1) is displaced according to the displacement (X) of the keeper (3).

In the latched state (B) of the hook-keeper unit (1), the two-part cowl (100) or cowling is properly closed. The keeper (3) is latched and cannot be moved while the spring (1.2), which is arranged coupled with the rod (1.1), tries to expand, but as the rod (1.1) is engaged, it is not dragged by the spring (1.2), thus remaining in an outward position. Additionally, in this case, the proximity sensor (6.1) is activated, because the target (6.2) is near the proximity sensor (6.1) to be detected thereby, so that the electrical warning means issue a latched status signal to a remote system by an electrical connection (6.3). Preferably, the signal sent is an electronic warning shown in the notice panel placed in the cockpit of the aircraft.

In the non-latched state (A) of the hook-keeper unit (1), the two-part cowl (100) or cowling is opened. The keeper (3) is loose, and is carried by the spring (1.2) to an inward position, while the spring (1.2) extends. The target (6.2) is thus carried by the rod (1.1) far enough to not be detected by the proximity sensor (6.1), so that the electrical warning means issue a non-latched signal to a remote system by an electrical connection (6.3). Likewise, preferably the signal sent is and electronic warning shown in the notice panel placed in the cockpit of the aircraft.

Figure 2C:
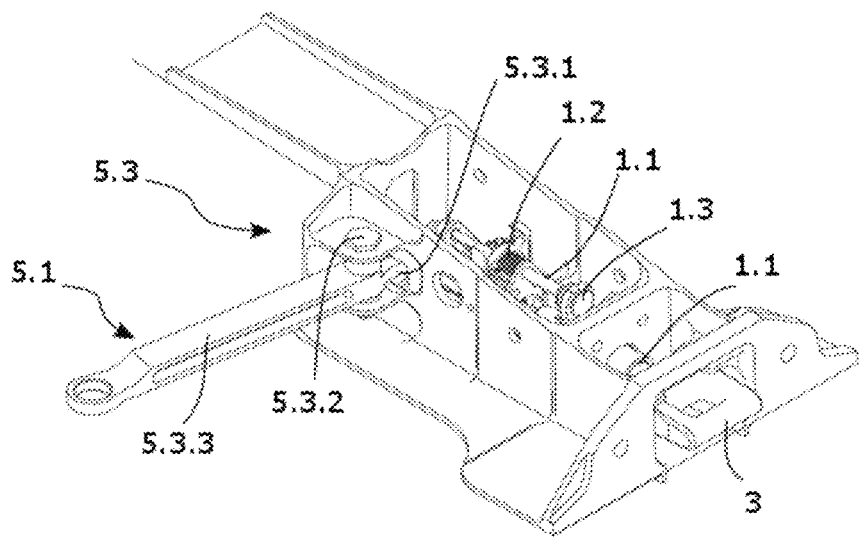
FIG. 2c shows a perspective view of the hook-keeper unit.

FIG. 2c shows a perspective view of the hook-keeper unit comprising the same elements as in FIG. 2a, except the hook (2). Additionally, this embodiment shows a first end (5.1) of the connecting mechanism (5) coupled to the hook-keeper unit (1) configured to automatically transmit the state of the hook-keeper unit (1).

In this embodiment, the connecting mechanism (5) comprises at the first end (5.1) a tilting piece (5.3), the tilting piece (5.3) comprising two portions (5.3.1, 5.3.3) fixedly joined by a tilting axis (5.3.2). The tilting axis (5.3.2) rests on the structure of the hook-keeper unit (1) for pivoting, wherein the first portion (5.3.1) is rotatably joined to the hook-keeper unit (1) absorbing the movement of the rod (1.1), or force exerted, and transmitting it to the second portion (5.3.3).

Figure 2D:
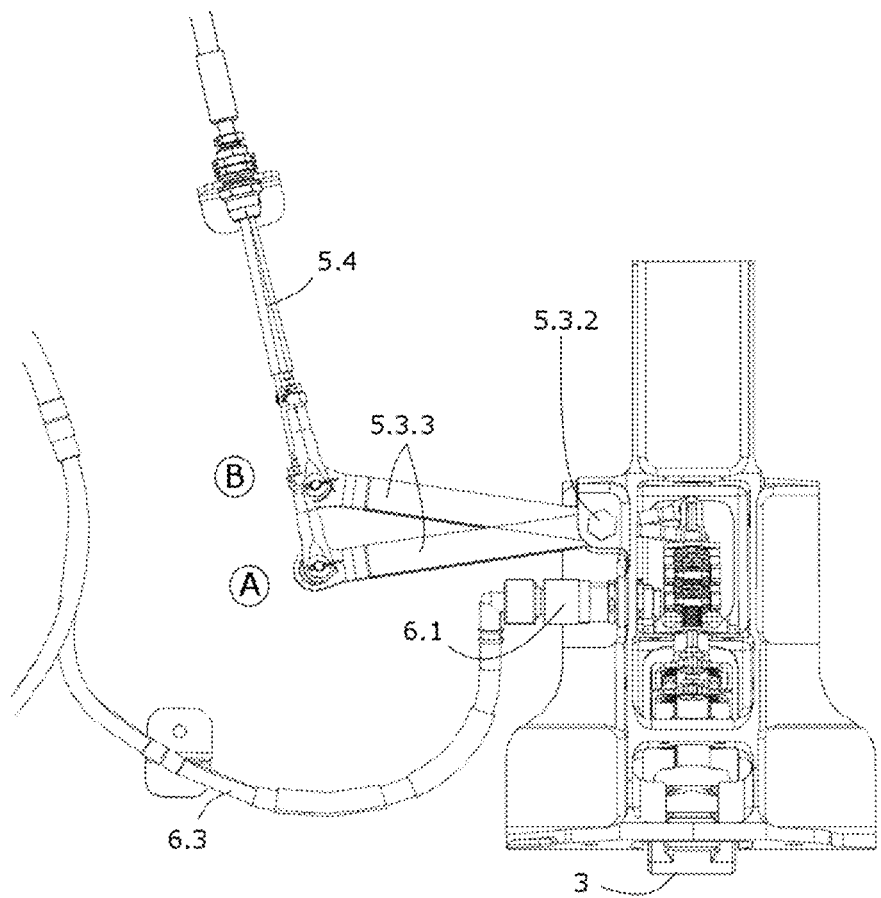
FIG. 2d shows the hook-keeper unit coupled to the tilting piece of the connecting mechanism.

FIG. 2d shows the hook-keeper unit (1) of FIG. 2c in its two states. Besides, this figure shows how the tilting piece (5.3) is positioned according to the state of the hook-keeper unit (1) when automatically transmits its state switching.

The rotatable joint between the first portion (5.3.1) of the tilting piece (5.3) and the rod (1.1) of the hook-keeper unit (1) is permanent, the first portion (5.3.1) coming along with the displacement (X) of the rod (1.1).

It is to be noted that all the joints addressed in this embodiments are permanent joints and, thus, the automatic movement transmission is direct in both directions.

In this particular embodiment, the second portion (5.3.3) is connected to a substantially inextensible coupling element (5.4) of the connecting mechanism (5). The substantially inextensible coupling element (5.4) connects the first (5.1) and second (5.2) ends of the connecting mechanism (5) (shown in FIG. 1b). Preferably, this substantially inextensible coupling element (5.4) is a cable.

As it was already mentioned, the first portion (5.3.1) is at reach of the rod (1.1), in a way that:
  when the rod (1.1) is in its inward state (non-latched state, A), the rod (1.1) pushes the first portion (5.3.1) of the tilting piece, and the movement of this portion is transmitted to the second portion (5.3.3), which is in turn attached to the substantially inextensible coupling element (5.4), and
  when the rod (1.1) is in its outward state (latched state, B), the rod (11) does not press the first portion (5.3.1) of the tilting piece (5.3), so the second portion (5.3.3) of the tilting piece does not exert any force to the substantially inextensible coupling element (5.4), this coupling element remaining at its rest position.

This is how the coupling between the rod (1.1) and the inextensible coupling element (5.4) is achieved.

Mechanical Warning Element (4)

Figure 3A:
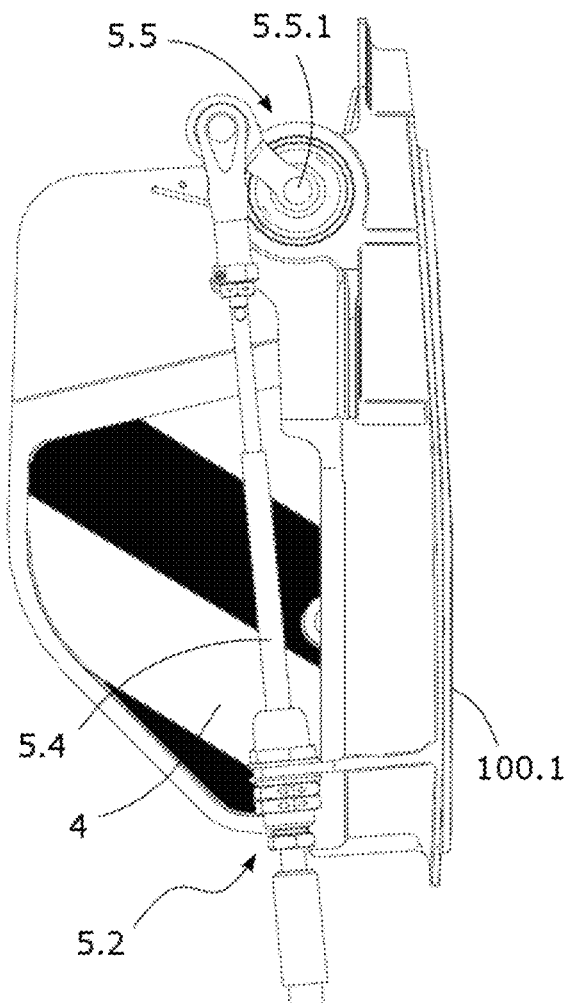
FIG. 3a shows a traverse view of the mechanical warning element in the unexposed state, and the positioner of the connecting mechanism.

FIG. 3a shows a traverse view of the mechanical warning element (4) in the unexposed state (C), and the positioner device (5.5) of the connecting mechanism.

Figure 3B:
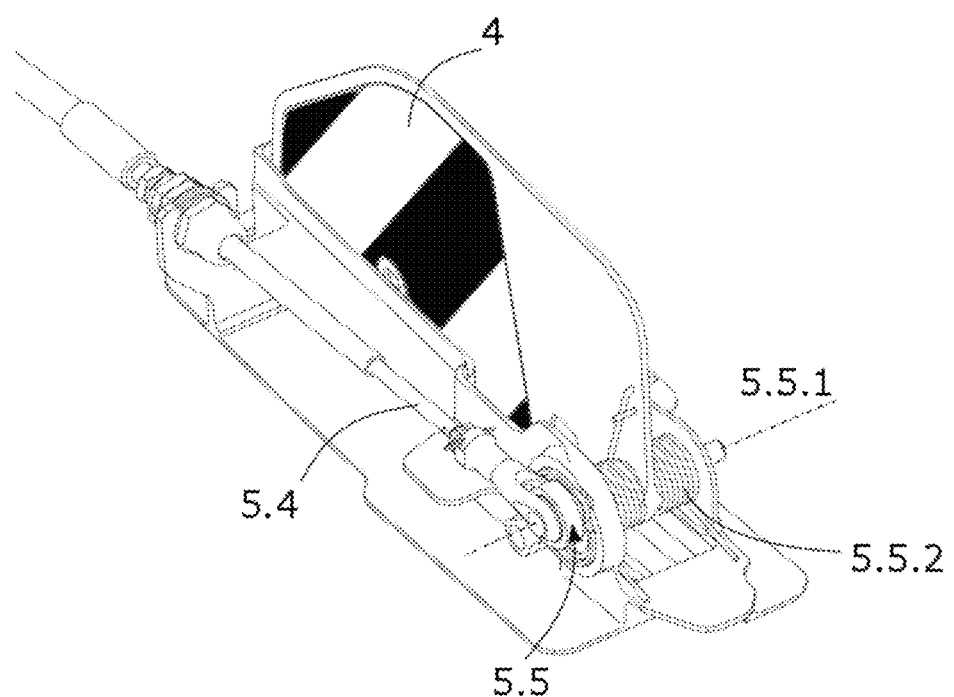
Figure 3C:
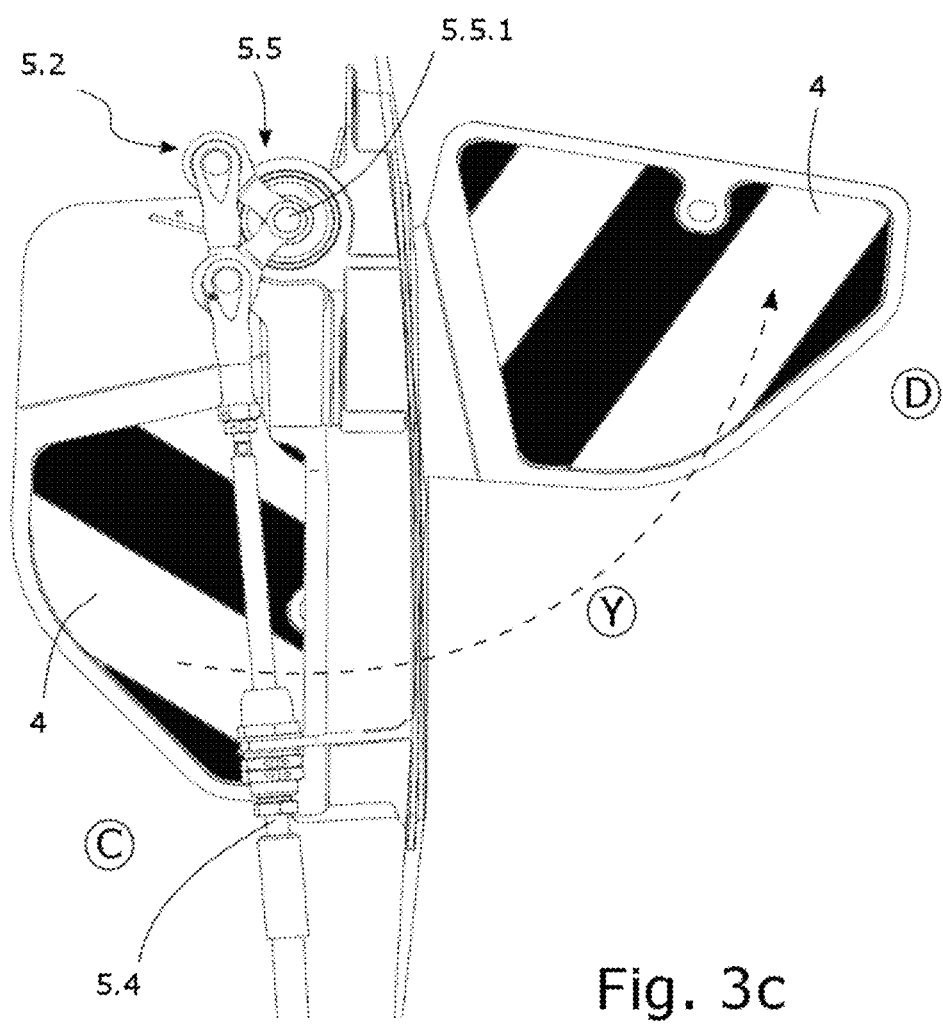
FIG. 3c shows the mechanical warning element of FIG. 3a in its two states.

In the embodiments shown in this description, the mechanical warning element (4) is configured to switch from an exposed state (D) to an unexposed state (C), and vice-versa (see FIG. 3c and corresponding explanations for a detailed description).

The substantially inextensible coupling element (5.4) of the connecting mechanism (5) ends at the second end (5.2), wherein it is arranged a positioner device (5.5) fixedly joined to a mechanical warning element (4). The positioner device (5.5) is configured to rotate around a rotating axis (5.5.1), and therefore a rotation of the positioner device (5.5.1) is directly transmitted to the mechanical warning element (4). As a consequence, the mechanical warning element (4) is automatically positioned in the exposed (D) or in the unexposed (C) state according to the state of a hook-keeper unit (1) transmitted by the connecting mechanism (5).

In the embodiment of FIG. 3b, it can be seen that the positioner device (5.5) comprises a pre-loaded torsion spring (5.5.2), which is configured to be in:
  a twisted state corresponding to the unexposed state (C) of the mechanical warning element (4), and
  a default state corresponding to the exposed state (D) of the mechanical warning element (4).

It is easily inferred from this embodiment that the default state of the torsion spring (5.5.2) is identified with an state less twisted than the twisted state per se; which advantageously allows that if a failure occurs, the mechanical warning element (4) is positioned in the exposed state (D) alerting to the operators or crew of such failure which took place any part of the system (10).

FIG. 3c shows the mechanical warning element of FIG. 3a in its two states (D, C), already explained. In particular, the mechanical warning element (4) is configured to be positioned:
  inside the cowling part (100.1) in the unexposed state (C), and
  outside the cowling part (100.1) in the exposed state (D).

As it can be seen in FIG. 3c, the mechanical warning element (4) is a flag and its exposure comprises an anti-clockwise rotatable deployment (Y).

When the hook-keeper unit (1) is open and the rod (1.1) is therefore in its inward position, the rod (1.1) pushes the first portion (5.3.1) of the tilting piece (5.3), causing its tilting, so that the second portion (5.3.3) of the tilting piece (5.3) pulls of the substantially inextensible coupling element (5.4). As shown, this coupling element (5.4) is connected to the positioner device (5.5) which rotates around its rotating axis (5.5.1) and releases the mechanical warning element (4) (fixedly joined thereto) by anti-clockwise rotatable deployment (Y).

When the hook-keeper unit (1) is closed, the substantially inextensible coupling element (5.4) is at its rest position (or less pulled instead). Thus, in this state, the positioner device (5.5) rotates clockwise around its rotating axis (5.5.1) and the mechanical warning element (4) is positioned in the unexposed state (C).

Advantageously, if the hook-keeper unit (1) is not properly closed, this system (10) prevents the mechanical warning element (4) from remaining unexposed if a third party tries to force it. As the positioner device (5.5) is always connected to the substantially inextensible coupling element (5.4) and this remains pulled until the hook-keeper unit (1) is properly closed, the torsion spring (5.5.2) of the positioner device (5.5) does not retain the mechanical warning element (4) in its unexposed state (D), this (4) being therefore moved by the torsion spring (5.5.2) to stand out.

Figure 3D:
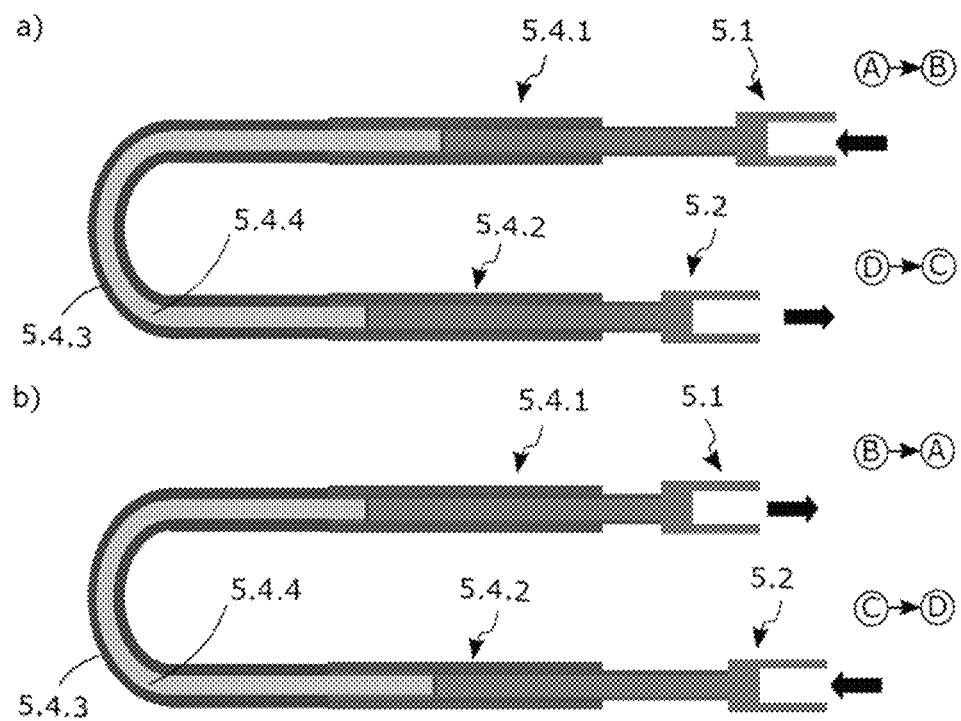
FIG. 3d shows schematic views of the inextensible coupling element pushing and pulling.

FIG. 3d shows schematic views of the inextensible coupling element (5.4), preferably a push-pull cable, comprising a first telescopic end rod (5.4.1) coupled to the first end (5.1), and a second telescopic end rod (5.4.2) coupled to the second end (5.2). The inextensible coupling element (5.4) provides an effective way of transmitting linear motion from one location to another, both by pulling or pushing action.

Subfigure a) of FIG. 3d shows a schematic view when the inextensible coupling element (5.4) is pushing, i.e., the switching from the non-latched (A) to the latched (B) state of the hook-keeper unit (1) automatically positioning the mechanical warning element (4) from the exposed (D) to the unexposed (C) state, accordingly. In this sense, subfigure b) of FIG. 3d shows a schematic view when the inextensible coupling element (5.4) is pulling (from the hook-keeper unit (1) to the mechanical warning element (4)); it is to say, in opposite direction as subfigure a) where the inextensible coupling element (5.4) is pushing.

In both subfigures a) and b), each telescopic end rod (5.4.1, 5.4.2) is connected to an inner body (5.4.4). This inner body (5.4.4) is able to slide inside a conduit (5.4.3), that is fixed to the cowling part (100.1 or 100.2). By the sliding, linear motion is transmitted from one telescopic end rod (5.4.1, 5.4.2) to the other. As it can be easily inferred, this sliding works in both directions, transmitting linear motion in both ways and therefore pushing (as in subfigure a) or pulling (as in subfigure b).

Advantageously, if the conduit (5.4.3) is correctly installed, it may be flexible enough as to adapt to the geometry of the cowling part (100.1 or 100.2), without jeopardizing the push-pull movement function.

Automatic bijective relationship between the hook-keeper unit (1) and the mechanical warning element (4)

As it has been already explained, the hook-keeper unit (1) and the mechanical warning element (4) are coupled between them by the connecting mechanism (5) in an automatic bijective relationship, so that:

when the hook-keeper unit (1) is in the latched state (B), the mechanical warning element (4) automatically is in the unexposed state (C), and when the hook-keeper unit (1) is in the non-latched state (A), the mechanical warning element (4) automatically is in the exposed state (D).

In this sense, a bijective relationship or one-to-one correspondence is a relationship between the states (B, C; A, D) of the two elements (1, 4), wherein:

each state (B, A) of one element (in this case the hook-keeper unit (1)) is paired with exactly one state (C, D) of the other element (in this case the mechanical warning element (4)), and each state (C, D) of the other element (4) is paired with exactly one state (B, A) of the first element (1).

A bijection relationship from the states (B, A) of the hook-keeper unit (1) to the states (C, D) of the mechanical warning element (4) has an inverse or reverse relationship from (4) to (1). Then, the existence of a bijection relationship means both elements (1, 4) have the same number of states. There are no unpaired states.

The non-latched state (A) of the hook-keeper unit (1) is automatically transmitted (without manual tasks from operators) to the mechanical warning element (4) by the connecting mechanism (5), being therefore in the exposed state (D). In the event the hook-keeper unit (1) is closed, being in the latched state (B), an automatic transmission (without manually tasks from operators) is produced to the mechanical warning element (4) throughout the connecting mechanism (5), being therefore in the unexposed state (C). Hence, the state switching of the hook-keeper unit (1) is automatically spread by the connecting mechanism (5) to update the state mechanical warning element (4).

System (10) Comprising a Plurality of Hook-Keeper Units (1)

Figure 4A:
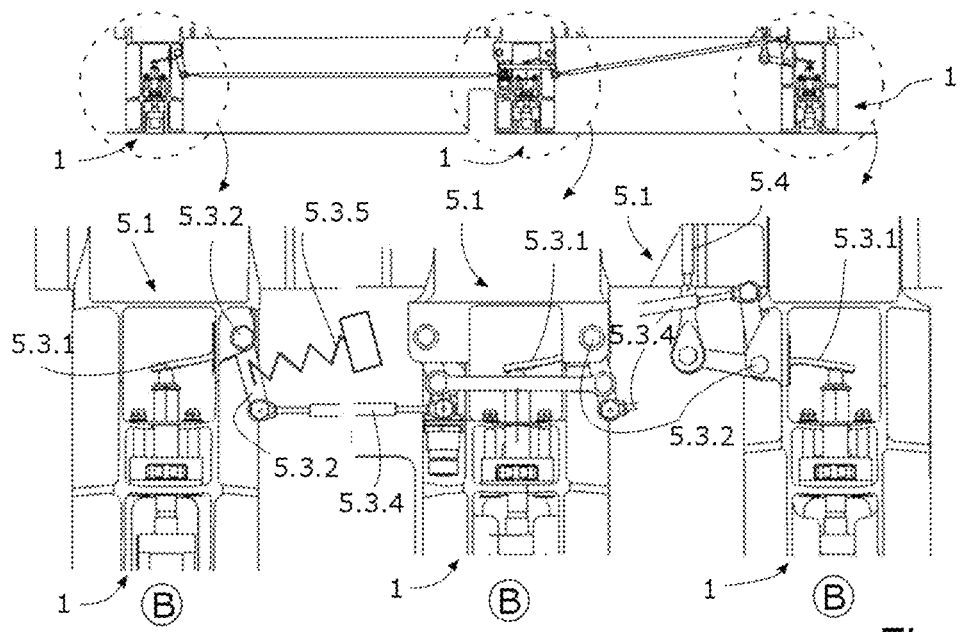
FIG. 4a shows the system comprising a plurality of hook-keeper units, being all the hook-keeper units in the latched state.
Figure 4B:
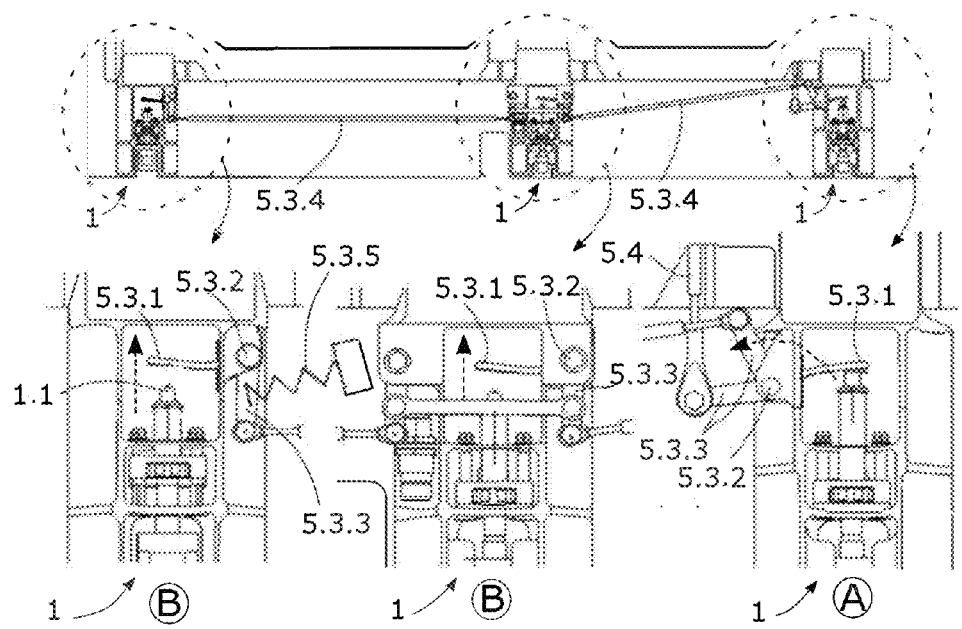
FIG. 4b shows the system comprising a plurality of hook-keeper units, being one of the hook-keeper units in the non-latched state.

FIGS. 4a and 4b shows a system (10) comprising a plurality of hook-keeper units (1) according to the invention. The connecting mechanism (5) also comprises a plurality of first ends (5.1).

In a particular embodiment, the system (10) comprises three hook-keeper units (1) and the connecting mechanism (5) comprises three first ends (5.1), each one comprising a tilting piece (5.3). Each tilting piece (5.3) comprises two portions (5.3.1, 5.3.3) fixedly joined by a tilting axis (5.3.2), the tilting pieces (5.3) are coupled to its immediate adjacent by the end of their second portions (5.3.3) by a coupling bar (5.3.4). In order to maintain all the first portions (5.3.1) resting on the bars (1.1) by default, the tilting piece (5.3) further comprises an auxiliary spring (5.3.5) coupled to the second portion (5.3.3) of at least one tilting piece (5.3). The auxiliary spring (5.3.5) maintains the first portions (5.3.1) resting on the bars (1.1) by a pre-loading of the spring, i.e., the auxiliary spring (5.3.5) tries to maintain all the tilting pieces (5.3) corresponding to the latched state (B) of their hook-keeper units (1).

In addition, the second portion (5.3.3) of at least one of the tilting pieces (5.3) is connected to a substantially inextensible coupling element (5.4) of the connecting mechanism (5), as in previous particular embodiments.

It is to be noted that in this system (10), the first portion (5.3.1) is not rotatably joined to the bar (1.1) of the hook-keeper unit (1); instead the first portion (5.3.1) is mechanically coupled to the rod (1.1), i.e., the first portion (5.3.1) is configured to rest on the end of the bar (1.1) when all the hook-keeper units (1) are in the latched state (B), and to be slightly separated to it when at least one of the hook-keeper unit (1) is in the non-latched state (A).

FIG. 4a shows a particular embodiment wherein all the hook-keeper units (1) are positioned in the latched state (B); and therefore all the first portions (5.3.1) are resting on the end of their corresponding bars (1.1). In this configuration, the mechanical warning element (4) is in the unexposed state (C).

FIG. 4b shows a particular embodiment in which one or more hook-keeper units (1) are opened (non-latched state (A)). In this particular embodiment, the hook-keeper unit (1) positioned at the right side is in the non-latched state (A), while the other two are kept in the latched state (B). In this situation, the bar (1.1) of the hook-keeper unit (1) at the right side goes inward and presses the first portion (5.3.1) (see the arrows shown in FIG. 4b). As can be see, the tilting piece (5.3) at the right side comprises two second portions (5.3.3) rigidly joined by the tilting axis (5.3.2) so the same rotation is transferred to both. Therefore, the coupling bar (5.3.4) is pulled, transmitting the movement to each one of the other tilting pieces (5.3) extending the auxiliary spring (5.3.5) and provoking that the first portion (5.3.1) of the middle and left sides be slightly separated to their bars (1.1) (see the arrows).

Accordingly, this movement is also remitted to the mechanical warning element (4) by pulling the substantially inextensible coupling element (5.4) for deploying thereof.

In addition, in this particular embodiment wherein the system (10) comprises a plurality of hook-keeper units (1), each hook-keeper units (1) comprising a pair proximity sensor (6.1)-target (6.2) configured to match when the hook-keeper unit (1) is in the latched state (B), as it was explained in FIG. 2b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for monitoring a state of a hook-keeper unit of an aeronautical structure, wherein the hook-keeper unit comprises a hook and a keeper, the system comprising:
    the hook-keeper unit configured to be movable between a latched state and a non-latched state,
    a mechanical warning element configured to be movable between an exposed state and an unexposed state, and
    a connecting mechanism comprising a first end coupled to the hook-keeper unit, and a second end coupled to the mechanical warning element, the connecting mechanism being configured to automatically transmit the state of the hook-keeper unit to the mechanical warning element,
    wherein the hook-keeper unit and the mechanical warning element are coupled between them by the connecting mechanism in an automatic bijective relationship, so that:
    when the hook-keeper unit is in the latched state, the mechanical warning element automatically is in the unexposed state, and
    when the hook-keeper unit is in the non-latched state, the mechanical warning element automatically is in the exposed state,
    wherein either the hook or the keeper of the hook-keeper unit is configured to be displaced from each other, wherein:
        if the hook or the keeper are displaced from each other, the hook-keeper unit is in the non-latched state; and
        if the hook or the keeper are not displaced from each other, the hook-keeper unit is in the latched state,
    wherein the connecting mechanism comprises at the first end a tilting piece, the tilting piece comprising a first and a second portion fixedly joined by a tilting axis,
    wherein the first portion is rotatably joined to the hook-keeper unit and the second portion is connected to a substantially inextensible coupling element of the connecting mechanism,
    wherein the connecting mechanism comprises at the second end a positioner device fixedly joined to the mechanical warning element, the positioner device being configured to rotate around a rotating axis so that the mechanical warning element automatically is in the exposed or in the unexposed state according to the state of the hook-keeper unit, and
    wherein the substantially inextensible coupling element transmits a displacement of either the hook or the keeper from the second portion of the tilting piece to the positioner device, said substantially inextensible coupling element being a cable.

2. The system according to claim 1, wherein the positioner device comprises a torsion spring configured to be in:
    a twisted state corresponding to the unexposed state of the mechanical warning element, and
    a default state corresponding to the exposed state of the mechanical warning element.

3. The system according to claim 1, wherein the mechanical warning element is configured to be positioned:
    inside the aeronautical structure in the unexposed state, and
    outside the aeronautical structure in the exposed state.

4. The system according to claim 1, wherein the mechanical warning element is a flag, and wherein the exposed state of the flag comprises a rotatable deployment.

5. The system according to claim 1, wherein the hook of the hook-keeper unit is configured to be latched with the keeper, and the hook-keeper unit further comprises:
    a rod rigidly connected to either the hook or the keeper; and
    a spring coupled with the rod, the spring being configured to be in:
        a rest state corresponding to the non-latched state of the hook-keeper unit, and
        a compressed state corresponding to the latched state of the hook-keeper unit.

6. The system according claim 5, wherein the rod is rigidly connected to the keeper.

7. The system according to claim 5, wherein the hook-keeper unit comprises a pair proximity sensor-target configured to match when the hook-keeper unit is in the latched state.

8. The system according to claim 7,
    wherein either the hook or the keeper of the hook-keeper unit is configured to be displaced from each other, wherein:
        if the hook or the keeper are displaced from each other, the hook-keeper unit is in the non-latched state; and
        if the hook or the keeper are not displaced from each other, the hook-keeper unit is in the latched state,
    wherein the target is placed on the rod, both being configured to be displaced together according to a displacement of either the hook or the keeper.

9. The system according to claim 7, wherein the proximity sensor is configured to send a signal with the state of the hook-keeper unit to a remote system by a connection.

10. The system according to claim 9, wherein the connection comprises an electrical connection.

11. The system according to claim 1, wherein the system comprises a plurality of hook-keeper units, and wherein the connecting mechanism comprises a plurality of first ends.

12. A two-part-cowl of an aircraft comprising the system according to claim 1.

* * * * *